United States Patent
Uenal et al.

(10) Patent No.: US 11,548,423 B2
(45) Date of Patent: Jan. 10, 2023

(54) METHOD FOR CONTROLLING AT LEAST TWO MECHANICAL OSCILLATORS

(71) Applicant: Daimler AG, Stuttgart (DE)

(72) Inventors: Emrullah Uenal, Hueckelhoven (DE); Gudrun Schoenherr, Holzgerlingen (DE)

(73) Assignee: Daimler AG, Stuttgart (DE)

( * ) Notice: Subject to any disclaimer, the term of this patent is extended or adjusted under 35 U.S.C. 154(b) by 1063 days.

(21) Appl. No.: 16/307,828

(22) PCT Filed: Jun. 1, 2017

(86) PCT No.: PCT/EP2017/000641
§ 371 (c)(1),
(2) Date: Dec. 6, 2018

(87) PCT Pub. No.: WO2017/211445
PCT Pub. Date: Dec. 14, 2017

(65) Prior Publication Data
US 2019/0299832 A1    Oct. 3, 2019

(30) Foreign Application Priority Data

Jun. 7, 2016  (DE) ..................... 10 2016 006 989.9

(51) Int. Cl.
*B06B 1/02*        (2006.01)
*G01H 3/06*        (2006.01)
(Continued)

(52) U.S. Cl.
CPC ............ *B60N 2/976* (2018.02); *B06B 1/0261* (2013.01); *G01H 3/06* (2013.01); *G01H 11/08* (2013.01);
(Continued)

(58) Field of Classification Search
CPC .......... A47C 31/126; A61H 2201/0149; A61H 2201/1633; A61H 2205/086;
(Continued)

(56) References Cited

U.S. PATENT DOCUMENTS 5,133,017 A * 7/1992 Cain ................. G10K 11/17881
381/71.4
5,170,433 A * 12/1992 Elliott .............. G10K 11/17857
704/226
(Continued)

FOREIGN PATENT DOCUMENTS

CN  1113862 A    12/1995
CN  103569013 A   2/2014
(Continued)

OTHER PUBLICATIONS

Japanese Office Action issued in Japanese application No. 2018-563854 dated Oct. 6, 2020, with partial English translation (Seven (7) pages).
(Continued)

*Primary Examiner* — David L Singer
(74) *Attorney, Agent, or Firm* — Crowell & Moring LLP

(57) ABSTRACT

A method for controlling at least two mechanical oscillators, more particularly in a motor vehicle, where each oscillator oscillates at a frequency during operation and where the frequency can be controlled by the power applied to the oscillators, includes arranging a single sound transducer at a distance from the oscillators and capturing an electrical signal, where the electrical signal is subjected to a Fourier transform and thus a Fourier spectrum is determined. The frequency of each oscillator is determined from extreme values of the Fourier spectrum.

9 Claims, 2 Drawing Sheets

(51) Int. Cl.
  *G01H 11/08* (2006.01)
  *G01H 13/00* (2006.01)
  *G01H 1/00* (2006.01)
  *G01H 3/00* (2006.01)
  *B60N 2/90* (2018.01)

(52) U.S. Cl.
  CPC ............... *G01H 13/00* (2013.01); *G01H 1/00* (2013.01); *G01H 1/003* (2013.01); *G01H 3/00* (2013.01)

(58) Field of Classification Search
  CPC ........ B06B 1/0261; B60N 2/00; B60N 2/015; B60N 2/02; B60N 2/0232; B60N 2/0244; B60N 2/0276; B60N 2/665; B60N 2/68; B60N 2/70; B60N 2/7094; B60N 2/90; B60N 2/914; B60N 2/976; B60N 2/986; B60N 2/99; B60N 2002/0264; B60N 2002/981; B60R 21/01554; B60R 21/207; G01M 99/001; G10K 2210/3221
  See application file for complete search history.

(56) References Cited

U.S. PATENT DOCUMENTS

| | | | | |
|---|---|---|---|---|
| 5,568,557 | A * | 10/1996 | Ross | G10K 11/17883 381/86 |
| 5,748,748 | A | 5/1998 | Fischer et al. | |
| 5,987,144 | A * | 11/1999 | Carme | G10K 11/17861 381/71.7 |
| 9,186,702 | B2 | 11/2015 | Tam | |
| 2008/0009776 | A1 * | 1/2008 | Trandafir | A61H 1/005 601/53 |
| 2009/0072768 | A1 * | 3/2009 | Murray | G08B 6/00 318/114 |
| 2010/0324852 | A1 * | 12/2010 | Wolf | G01H 13/00 702/104 |
| 2012/0133448 | A1 * | 5/2012 | Gregg | G01N 3/32 331/116 R |
| 2014/0148217 | A1 | 5/2014 | Tam | |

FOREIGN PATENT DOCUMENTS

| | | |
|---|---|---|
| CN | 105584391 A | 5/2016 |
| DE | 10 2014 216 161 A1 | 2/2016 |
| EP | 1 991 129 B1 | 11/2008 |
| JP | 6-304094 A | 11/1994 |
| JP | 9-127957 A | 5/1997 |
| WO | WO 2011/062869 A1 | 5/2011 |

OTHER PUBLICATIONS

Japanese Office Action issued in Japanese application No. 2018-563854 dated Dec. 3, 2019, with partial English translation (Six (6) pages).

Chinese Office Action issued in Chinese application No. 201780035215.9 dated Dec. 30, 2019, with partial English translation (Thirteen (13) pages).

PCT/EP2017/000641, International Search Report dated Sep. 11, 2017 (Two (2) pages).

* cited by examiner

METHOD FOR CONTROLLING AT LEAST TWO MECHANICAL OSCILLATORS

BACKGROUND AND SUMMARY OF THE INVENTION

The present invention relates to a method for controlling at least two mechanical oscillators, more particularly in a motor vehicle. The invention also relates to a motor vehicle having at least two such mechanical oscillators, which are controlled in such a way.

Mechanical oscillators, more particularly vibration motors, are used in a variety of applications. In particular, they are used in motor vehicles to deliberately produce vibrations. Such oscillators can be used in particular in a seat of the motor vehicle in order to produce vibrations that can be transferred to the body of an occupant. Such oscillators are usually controlled by means of the power applied to the oscillator, more particularly by means of an applied direct voltage. Thus, by changing the applied power, the oscillatory behavior or the frequency, the oscillator in question can be changed and therefore controlled. Such oscillators are generally arranged or embedded in a medium, more particularly in the padding of such a seat. The oscillatory behavior, more particularly the frequency of the oscillator in question, which frequency is related to the applied power, differs when the oscillator is embedded in the medium in comparison with when the oscillator is free or embedded in another medium. Therefore, for accurate or precise use of the oscillator in question, the oscillatory behavior or the frequency of the oscillator when embedded in the medium must be known.

If the oscillators are not coordinated with each other, undesired superpositions of the oscillations of the oscillators or frequencies of the oscillators, for example, can occur, which in particular lead to an undesired beat, as it is known.

In order to determine the frequency of the oscillator in question, it is conceivable that a relationship between the applied power and the frequency when the oscillator is embedded in the medium is recorded and the frequency of the oscillator is inferred from the applied power. However, this manner of determining the frequency and controlling the oscillator is unreliable. In particular, material fatigue and aging processes, in particular of the oscillator and/or of the medium, lead to corresponding changes in the relationship between the applied power and the frequency of the oscillator.

In order to solve this problem, it is conceivable in principle that an associated sensor is provided on the oscillator in question in order to determine, and if necessary to adjust, the oscillatory behavior of the oscillator, in particular the frequency of the oscillator, during operation. Such sensors are usually pulse sensors or inductive sensors or Hall sensors. Optical sensors can also be considered for this purpose. A disadvantage is that the realization of such an oscillator requires additional components and is complicated. In addition, the sensors provided on the oscillators oscillate with the oscillators and therefore are damaged over time and/or are subject to an accelerated aging process and accordingly provide false results.

The present invention is therefore concerned with the problem of specifying, for a method for controlling at least two mechanical oscillators and for a motor vehicle having at least two such mechanical oscillators controlled in such a way, improved embodiments that are distinguished in particular by simplified and/or reliable and/or economical control of the oscillators.

The present invention is based on the general idea of sensing the oscillations of at least two oscillators by means of a sound transducer, transforming the recorded signal into a Fourier spectrum, and then determining the frequency of each oscillator by assigning extreme values in the Fourier spectrum. Subsequently, the frequency of each oscillator can be adjusted to a specified or desired frequency by changing the power applied to the oscillator, if there is a difference between the determined frequency and the desired frequency. Therefore, by means of the solution according to the invention, the frequency of a plurality of oscillators can be precisely determined by means of a single sensor, namely the sound transducer. The oscillators can thus be sensed accurately and in a simplified manner. Furthermore, additional sensors provided on the oscillators are no longer necessary, and therefore the implementation of the control of the oscillators is simplified.

According to the idea of the invention, each oscillator oscillates at a frequency during operation, the frequency of each oscillator being controllable by means of the power applied to the oscillator. According to the invention, a single such sound transducer is arranged at a distance from the oscillators and an electrical signal is captured by means of the sound transducer during operation. The captured electrical signal is subjected to a Fourier transform in order to determine such a Fourier spectrum. Then the frequency of each oscillator is determined from extreme values of the Fourier spectrum. In particular, the frequency of each oscillator is determined from a peak in the Fourier spectrum, thus in particular corresponds to the peak.

Of course, the electrical signal captured by means of the sound transducer can be otherwise processed before or after the Fourier transform in order, in particular, to preclude or eliminate errors and the like.

If a difference is determined between the determined frequency of such an oscillator and a desired or specified frequency, the determined frequency can be correspondingly adjusted to the desired frequency by correspondingly changing the power applied to the oscillator.

The power applied to each oscillator is, in particular, electrical power. It is preferred if at least one of the oscillators, advantageously each oscillator, is operated by the application of a direct voltage. This permits simple control of the frequency of the oscillator in question, in particular because there can be a simple dependence between the applied voltage and the frequency of the oscillator.

According to preferred embodiments, an associated characteristic curve is assigned to each oscillator in the Fourier spectrum. The frequency of each oscillator is then determined from an extreme value, in particular from a peak, of the associated characteristic curve in the Fourier spectrum. This makes it possible, in particular, to distinguish between the different oscillators in the Fourier spectrum and therefore to carry out a reliable determination of the frequency of each oscillator.

The characteristic curve of each oscillator is preferably assigned in that the oscillator in question is operated separately and the associated characteristic curve is assigned from the Fourier spectrum following from the electrical signal. The separate operation of each oscillator and the assignment of the associated characteristic curve can be carried out in the course of a calibration performed once or at regular intervals. It is also conceivable that such a calibration is carried out before joint operation of the oscillators.

Designs in which the oscillators and the sound transducer are arranged in the same medium have proven advantageous.

As a result of this, the propagation of the frequencies of each oscillator to the sound transducer has an identical or at least similar behavior. This allows a more precise determination of the frequencies of the oscillators and/or a comparison between the oscillatory behavior of the oscillators.

In principle, it is conceivable that two of the oscillators are operated at the same frequency or a similar frequency.

It is preferred if the oscillators are operated at different frequencies. This means that the frequencies of the oscillators differ. This allows the frequency of each oscillator to be determined more accurately. Furthermore, undesired superpositions of the frequencies of the oscillators, in particular beats, for example beat tones, are thus avoided or at least reduced.

In principle, the oscillators can be of any design. At least one such oscillator can have an oscillatory motor, more particularly a vibration motor. This means that the oscillator is operated at a rotational frequency, more particularly vibration frequency, during operation, the rotational frequency, more particularly vibration frequency, being controlled according to the invention.

The sound transducer can be of any design, provided that the sound transducer converts the frequencies received from the oscillators, more particularly the sound received from the oscillators, into an electrical signal. It is conceivable in particular that a piezoelectric sound transducer permitting more accurate capturing of the electrical signal is used.

The oscillators and the method according to the invention can be used in any application. The use of the oscillator and the method in a motor vehicle is conceivable in particular. The method is preferably carried out by means of a correspondingly designed control device.

The oscillators are preferably used in a seat of the motor vehicle and serve to transfer vibrations to the body of an occupant of the motor vehicle. By means of the oscillators, it is thus possible in particular to haptically stimulate, more particularly massage, the occupant. It is also possible to produce structure-borne sound in the body of the occupant by means of the oscillators.

It is preferred that the sound transducer and the oscillators are arranged in the same medium Therefore, if the oscillators are arranged in a seat of the motor vehicle, the oscillators and the sound transducer are preferably arranged in the padding of the seat.

It should be ensured that the sound transducer is fixedly provided on the assembly in question, in particular that the sound transducer does not perform any oscillations itself, so that the frequencies of the oscillators can be accurately determined.

Further important features and advantages of the invention are clear from the drawings and the associated figure description on the basis of the drawings.

Of course, the features described above and to be explained below can be used not only in the specified combinations but also in other combinations or alone without leaving the framework of the present invention.

Preferred embodiments of the invention are presented in the drawings and are explained in more detail in the following description. The same or similar or functionally identical components are referred to by the same reference signs.

DETAILED DESCRIPTION OF THE DRAWINGS

Figure 1:
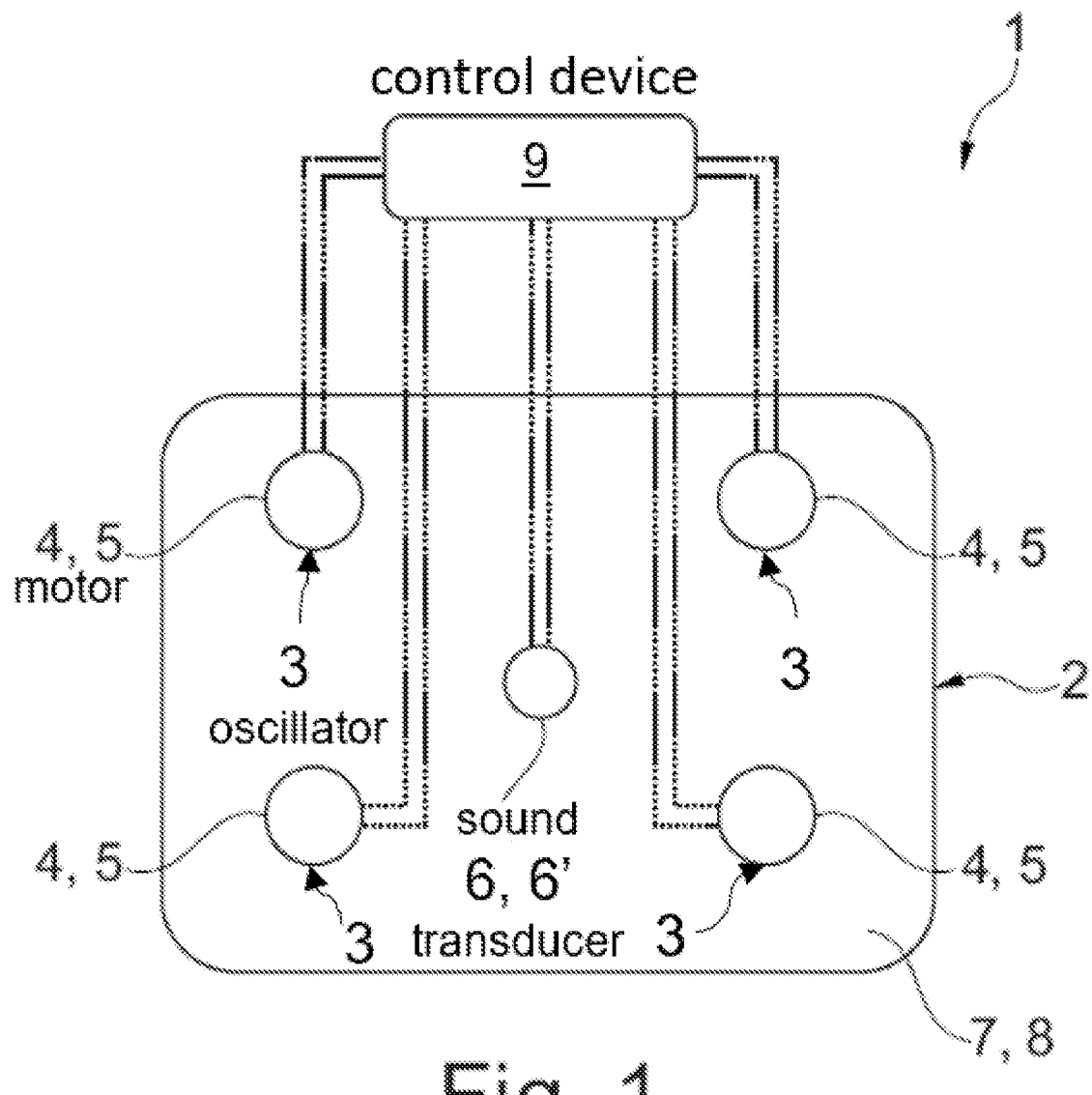
FIG. 1 is a greatly simplified, circuit-diagram-like representation of a motor vehicle.

In FIG. 1, a motor vehicle 1 is shown in a greatly simplified and circuit-diagram-like manner. A seat 2 of the motor vehicle 1, in which several oscillators 3 are arranged at a distance from each other, can be seen. The oscillators 3 serve the purpose of transferring vibrations to a body of an occupant, who is not shown. For this purpose, electrical power, in the present case a direct voltage, is applied to each oscillator in such a way that each oscillator 3 oscillates at an associated frequency. A change in the applied power leads to a corresponding change in the frequency of the associated oscillator 3. Each oscillator 3 has an oscillatory motor 4, such as a vibration motor 5. A sound transducer 6, more particularly a piezoelectric sound transducer 6', is also integrated in the seat 2 and arranged at a distance from the oscillators 3. The oscillators 3 and the sound transducer 6 are arranged in the same medium 7—in the example shown, in a padding 8 of the seat 2. The sound transducer 6 is integrated in the medium 7 in such a way that the sound transducer 6 does not perform any independent oscillations.

Each oscillator 3 oscillates at a frequency, the oscillations propagating to the sound transducer 6 via the medium 7. The sound transducer 6 converts the received oscillations into an electrical signal. Each oscillator 3 and the sound transducer 6 are connected to a control device 9 so that the control device 9 in particular can receive and further process the electrical signal of the sound transducer 6 and can change the power applied to each oscillator 3, in particular the direct voltage applied to each associated oscillator 3, and can accordingly adjust the frequency of the oscillators 3.

Figure 2:
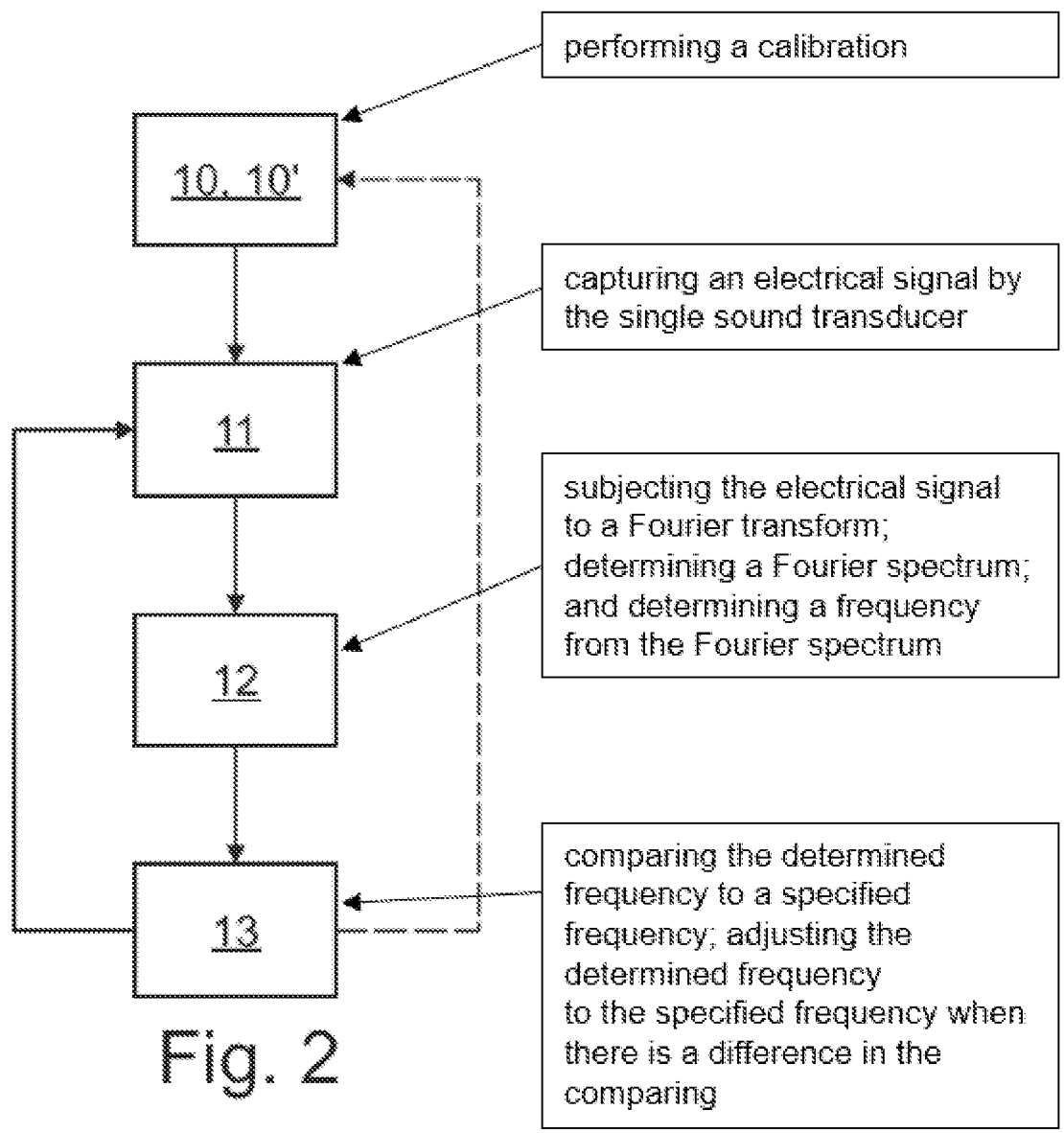
FIG. 2 is a flowchart for illustrating the method according to the invention.

According to FIG. 2, in a first method step 10, which can also be referred to as calibration step 10', each oscillator 3 is first operated separately. The electrical signal captured by means of the sound transducer 6 is subjected to a Fourier transform in the control device 9 and thus a Fourier spectrum is created. In the Fourier spectrum, a characteristic curve is clear, which is assigned to the separately operated oscillator 3. This means that, in the first method step 10, by means of the separate operation of each oscillator 3, an associated characteristic curve is assigned to the oscillator 3 in question in the Fourier spectrum. The oscillators 3 are operated at different frequencies so that there is sufficient difference between the characteristic curves of the oscillators 3 in the Fourier spectrum and the characteristic curves thus can be easily distinguished. Furthermore, as a result of the operation of the oscillators 3 at different frequencies, no undesired superpositions of the frequencies of the oscillators 3 occur, in particular no beat tones arise.

If the calibration has been performed in the first method step 10, normal operation of the oscillators 3 can be initiated by oscillating each oscillator 3 at a frequency by applying corresponding power. In this operation, in the second method step 11, an electrical signal is captured by means of the sound transducer 6 and transferred to the control device 9. In the third method step 12, the electrical signal recorded by means of the sound transducer 6 is subjected to a Fourier transform and thus a Fourier spectrum is determined. In the Fourier spectrum, a characteristic curve can be assigned to each oscillator 3, in particular on the basis of the calibration performed in the first method step 10. Each characteristic curve has an extreme value, in particular a peak, which is used to determine the frequency of the associated oscillator 3. In particular, the frequency of each oscillator 3 corresponds to the peak of the associated characteristic curve in the Fourier spectrum.

If the frequency of each oscillator 3 has been determined, a comparison between the determined frequency of each oscillator 3 and a specified or desired frequency is made in the fourth method step 13. If a difference between the frequencies is determined, the power applied to the associated oscillator 3 is adjusted in order to adjust the determined frequency to the desired frequency. Thereafter, the method step 13 can return to method step 11 so that the recording of the electrical signal and the determination of the frequency of each oscillator 3 are carried out repeatedly, more particularly in a loop or at time intervals.

The method can alternatively also return to the first method step 10 after method step 13. In this case, it is preferred that the first method step 10 is carried at regular intervals and/or before start-up of the oscillators 3.

The invention claimed is:

1. A method for controlling at least two mechanical oscillators, wherein each of the at least two mechanical oscillators oscillate at a respective frequency during operation and wherein the respective frequency is controllable by a respective power applied to the at least two mechanical oscillators, comprising the steps of:
   arranging a single sound transducer at a distance from the at least two mechanical oscillators, wherein the at least two mechanical oscillators and the single sound transducer are disposed in a seat of a motor vehicle;
   sensing respective oscillations from the at least two mechanical oscillators transmitted through the seat by the single sound transducer and converting the respective oscillations sensed by the single sound transducer into an electrical signal by the single sound transducer;
   subjecting the electrical signal to a Fourier transform and determining a Fourier spectrum;
   determining the respective frequency of each of the at least two mechanical oscillators from respective extreme values of the Fourier spectrum;
   comparing the respective determined frequency of each of the at least two mechanical oscillators to a respective specified frequency of each of the at least two mechanical oscillators; and
   adjusting the respective determined frequencies to the respective specified frequencies by changing the respective power applied to the at least two mechanical oscillators when there is a difference between the respective determined frequencies and the respective specified frequencies.

2. The method according to claim 1, wherein each of the at least two mechanical oscillators is operated by application of a respective direct voltage.

3. The method according to claim 1 further comprising the step of assigning a respective characteristic curve to each of the at least two mechanical oscillators in the Fourier spectrum and wherein the respective frequency is determined from an extreme value of the respective characteristic curve.

4. The method according to claim 3, wherein each of the at least two mechanical oscillators are first operated separately and wherein the respective characteristic curve is assigned from the Fourier spectrum following from the electrical signal.

5. The method according to claim 1, wherein the at least two mechanical oscillators are operated at different frequencies.

6. A motor vehicle, comprising:
   at least two mechanical oscillators, wherein each of the at least two mechanical oscillators oscillate at a respective frequency during operation and wherein the at least two mechanical oscillators are arranged in a seat of the motor vehicle;
   a sound transducer, wherein the sound transducer is arranged in the seat of the motor vehicle at a distance from the at least two mechanical oscillators and wherein the sound transducer senses respective oscillations from the at least two mechanical oscillators transmitted through the seat and converts the respective oscillations sensed by the single sound transducer into an electrical signal; and
   a control device, wherein the control device is configured to:
      subject the electrical signal of the sound transducer and received at the control device to a Fourier transform and to determine a Fourier spectrum;
      determine the respective frequency of the at least two mechanical oscillators from respective extreme values of the Fourier spectrum;
      compare the respective determined frequency of each of the at least two mechanical oscillators to a respective specified frequency of each of the at least two mechanical oscillators; and
      adjust the respective determined frequencies to the respective specified frequencies by changing a respective power applied to the at least two mechanical oscillators when there is a difference between the respective determined frequencies and the respective specified frequencies.

7. The motor vehicle according to claim 6, wherein at least one of the at least two mechanical oscillators has an oscillatory motor.

8. The motor vehicle according to claim 7, wherein the oscillatory motor is a vibration motor.

9. The motor vehicle according to claim 6, wherein the control device is further configured to assign a respective characteristic curve to each of the at least two mechanical oscillators in the Fourier spectrum and to determine the respective frequency from an extreme value of the respective characteristic curve.

* * * * *